M. F. CHASE AND F. E. PIERCE.
MANUFACTURE OF SULPHURIC ANHYDRIDE AND SULPHURIC ACID.
APPLICATION FILED JULY 9, 1920.
1,405,669.
Patented Feb. 7, 1922.
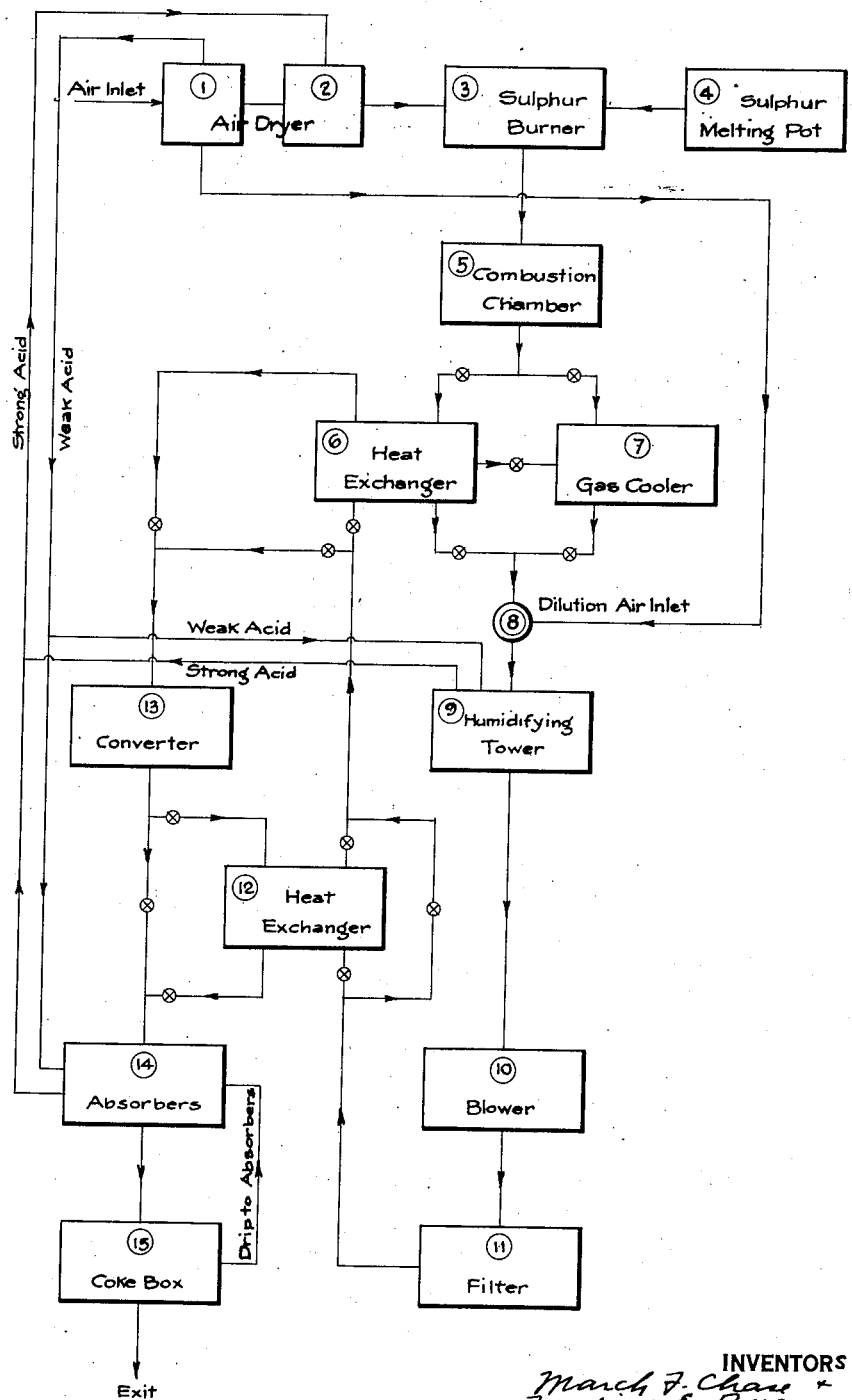
INVENTORS
BY
ATTORNEY

UNITED STATES PATENT OFFICE.

MARCH F. CHASE, OF ARDSLEY-ON-HUDSON, AND FREDERIC E. PIERCE, OF NEW YORK, N. Y., ASSIGNORS TO THE COS PROCESS COMPANY, INC., OF NEW YORK, N. Y., A CORPORATION OF NEW YORK.

MANUFACTURE OF SULPHURIC ANHYDRIDE AND SULPHURIC ACID.

1,405,669.  Specification of Letters Patent.  Patented Feb. 7, 1922.

Application filed July 9, 1920. Serial No. 394,928.

*To all whom it may concern:*

Be it known that we, MARCH F. CHASE and FREDERIC E. PIERCE, citizens of the United States, and residing at Ardsley-on-Hudson, Westchester County, State of New York, and city, county, and State of New York, respectively, have invented the following Improvements in the Manufacture of Sulphuric Anhydride and Sulphuric Acid.

The object of our invention is to provide a process by means of which sulphuric anhydride or sulphuric acid may be produced more efficiently than has been possible heretofore, and with less and cheaper apparatus.

More specifically, we propose to obtain our increased efficiencies by drying air used in the process to the utmost degree which enables us to eliminate certain expensive and inefficient pieces of apparatus, particularly those heretofore generally used for the purification of the burner gases, and subsequently humidifying these gases in an acid tower or by other means for the purposes of securing the best conversion results, and also by utilizing for the purposes of operation and control, heat which has heretofore been wasted.

With the above and other objects in view, as will appear more fully hereinafter, our invention comprises the novel steps and processes which we will now describe with reference to the accompanying diagrammatic drawing.

The manufacture of sulphuric anhydride and sulphuric acid by the contact process is well known and has been accomplished by processes which consist in general of the following necessary steps:—

1st.—The production of sulphur dioxide in the form of burner gases generally varying in content of sulphur dioxide between 3% and 8% by volume, 2nd—the purification of said burner gases, 3rd—the conversion of the sulphur dioxide contained in the purified burner gases to sulphuric anhydride by bringing it into contact with catalytic material, and 4th—the absorption of the sulphuric anhydride thus produced in sulphuric acid.

Sulphur dioxide produced in the customary manner, in the form of burner gases, usually contains certain impurities traceable to the raw materials, and other impurities resulting from the action of the sulphuric acid in the gases, upon the iron or other materials of which the apparatus is made. This sulphuric acid is formed by the uniting of the moisture in the air used to burn the sulphur with the sulphuric anhydride contained in the burner gases, always produced to a greater or less extent when sulphur bearing materials or brimstone are burned. The impurities which result from its action upon the iron of the apparatus, include the very objectionable and poisonous arsenical and similar gaseous impurities. This sulphuric acid is in the form of mists and fogs and acts as a carrier of dust and other mechanical impurities.

For the removal of the impurities above referred to the gases have to be subjected to certain operations and treatments which require elaborate and expensive apparatus which has been devised and has heretofore been in general use. In order to eliminate everything but simple mechanical purification apparatus, our invention includes the production of sulphur dioxide by burning brimstone, which is free from objectionable impurities, which has been previously molten and thus freed from any moisture possibly contained in it, with air which has been previously dried to such an extent as to prevent the formation of objectionable acid mists and fogs. Thus the gases produced do not contain any objectionable impurities, either inherent or derived from the action of sulphuric acid upon the material of the apparatus, and it is therefore unnecessary to provide means for removing such impurities.

Any of the well known methods for drying the air may be employed but we prefer to use towers through which sulphuric acid of different strengths is circulated together with the air. Suitable spray catchers and filters follow the towers to remove any acid spray carried over by the air.

We prefer to dry the air in two stages, in the first using acid of moderate strength and of variable but controlled temperatures so that the air may have such predetermined humidity as may be required for the most efficient conversion reactions; in the second stage, using strong relatively cool acid in order to complete the drying to the extent required.

The air going to the burner passes through both stages and it is desirable to keep the volume of air to a low limit in order to reduce the volume of the burner gases and thus produce a low velocity in the gases passing through the burner and thereby reduce their tendency to carry over mechanically sublimed sulphur, dust and other foreign materials. We prefer to control this operation so that the burner gases contain about 11% of sulphur dioxide, but under certain conditions it may be desirable to produce stronger gases. The operation may be conducted so as to produce burner gases containing 15% of sulphur dioxide or even more, and in this case it will be necessary to add sufficient air to increase the oxygen content of the total to the extent required for the best conversions.

In order that no excess of moisture may be introduced in the gases the air for this dilution is taken from the first stage of the air dryer which will be more fully explained presently.

As shown in the drawing, we preferably melt the sulphur in the melting pot 4, from which it flows to the burner 3, where it is burned with dry air which has passed through the two stages of the air dryer 1 and 2. The burner is sealed to prevent the admission of any undried air or moisture. Following the sulphur burner the gases preferably pass through a separate combustion chamber 5, just before which more thoroughly dried air may be admitted to complete the combustion.

It is well known that the catalytic material employed in converters is most active and efficient within certain well defined temperature limits. Because of the fact that the gases coming directly from the combustion chamber are at a higher temperature than is found efficient for conversion and at a considerably higher temperature than it is desired to pass through the blower and other parts of the system to which we will refer later, we provide means following the combustion chamber for cooling the gases. These means preferably include a heat exchanger 6 and a gas cooler 7 arranged in parallel.

By passing all or a part of the hot gases from the combustion chamber through the heat exchanger we are enabled to obtain sufficient heat to properly control the entire process under any and all conditions. This is a great advantage over prior practices in which the heat of conversion alone has been depended upon for temperature control purposes. While the heat of conversion has been found sufficient under most favorable conditions, it has frequently been found necessary as a result of unavoidable heat losses due to radiation, etc., to employ some external source of heat in addition to the heat of conversion in order to prevent condensation of sulphuric acid and consequent injury to the apparatus. By our improved process we eliminate the necessity of using any external source of heat at any time and thus effect marked economy as compared with prior practice.

It is also well known that perfectly dry gases are not converted as readily as when a very small percentage of moisture is present, which, however, should not exceed 1 grain of water per cu. ft. With variations in the humidity of the atmosphere, which are always happening, it is sometimes difficult to control this factor of successful operation.

We have found that the gases may be humidified to the extent required by passing them through a tower in which sulphuric acid of predetermined strength and temperature is circulated. For this purpose we prefer to use acid with a strength varying between 85% and 90% of $H_2SO_4$ and at a temperature between 80° C and 100° C. Such acid gives up moisture to the burner gases to such an extent as to humidify them to the degree required for the best conversion results.

The acid in this humidifying tower tends to become concentrated and in order to control this we dilute it with weakened acid taken from the drying towers and return the excess in concentrated form to the drying towers.

If very strong burner gases are produced and have to be diluted, as previously explained, the air with the predetermined moisture content is introduced in the system just preceding the humidifying tower, and all being thoroughly mixed in the tower are brought to the required state of moisture content as already explained. The introduction of the dilution air at this point also produces an added cooling effect on the gases.

Under certain conditions it may be desirable to use only the dilution air to humidify the gases to the extent required and in this case the process may be carried out without the use of the humidifying tower.

Referring to the diagram a dilution air inlet 8 is followed by a humidifying tower 9 which would include a suitable spray catcher and filter to remove any acid spray carried over by the gases and also serve to remove other mechanical impurities. The humidifying tower may be placed at the point indicated on the diagram or at any other suitable point.

In the operation of brimstone burners it sometimes happens that sulphur is sublimed, although a well regulated air supply and a well proportioned combustion chamber will ordinarily prevent this. The filter of the humidifying tower will obviate the possibility of stoppages in the gas passages, the blower and other apparatus, due to this or other mechanical impurities. The blower 10, which will be referred to hereinafter, follows the humidifying tower and a filter 11 follows the blower. This filter may be of any well known form and packed with any finely divided or fibrous material that may be interposed to intercept or screen out mechanical impurities.

Since blowers of the type employed in sulphuric acid plants operate to best advantage when the gases passing through them are at approximately atmospheric temperature, we preferably so regulate the heat exchanger, gas cooler, air inlet and humidifying tower so as to reduce the temperature of the gases to about this point at the blower. We prefer also to place the blower in the intermediate position in the system shown so that the suction and the pressure will be approximately equal, since we find that blowers operate most efficiently under these conditions.

After passing through the filter 11 the gas is ready to be heated to the proper temperature and passed through the converter 13. The temperature may be readily adjusted by means of the heat exchanger 6, heretofore referred to, and the heat exchanger 12 which serves the purpose also of cooling the gases coming from the converter. Suitable by-passes are arranged around each of these heat exchangers to facilitate temperature regulation.

The operation of conversion consists in passing the burner gases heated to about 375° C. uninterruptedly through the catalytic material, meanwhile cooling them and the catalytic material by the incoming but relatively cool burner gases. The temperature of the catalytic material and the gases passing through should be kept between 375° C. and 450° C. This can be done if the apparatus is designed to effect the necessary heat exchange. It depends on a number of factors, the most important of which are the strength of the burner gases, the catalytic material and the design of the converter.

If the burner gases contain 7% or 8% of sulphur dioxide the volumes are such that the heat due to conversion even after the unavoidable losses due to radiation is sufficient to do all the preheating necessary, and the operation can go on without the use of heat from external sources. If the burner gases drop down in sulphur dioxide content to 3% or 4% the use of external heat is essential. If, on the other hand, they increase in strength of sulphur dioxide to 10% or 11%, the reaction becomes too intensive and some means for extra cooling have to be employed. The operation is apt to get beyond control and the converted gas, because of the excessive heat, reverts with net low conversion results. With the flexibility in the control of the temperature of the gases in our process it can be adjusted to treat gases of any strength of sulphur dioxide.

The catalytic material which we prefer to use in our process is the so-called Schroeder mass (U. S. Patents 636924 and 636925) but we do not wish to be limited to this or any other kind, as with proper arrangements any of them may be used. The Schroeder mass as usually employed contains between 15/100 and 4/10 of 1% of platinum, but with our process we may use a mass of a much higher platinum content. The use of mass with a higher platinum content produces more intensive reactions in the converter, which with our process may be controlled and employed to advantage.

The converter we prefer to use is a steel shell, with such insulation on its exterior as will prevent undue radiation and is so arranged as to hold the catalytic material in suspended tubes of relatively small diameter. The incoming gas preheated sufficiently to meet the needs of the operation, receives heat from the catalytic material in the tubes around which it circulates. This apparatus is well known (see Knietsch U. S. Patents 688,469, 688,470, 688,471 and 688,472). Another type of converter would have the catalytic material surrounding the tubes and the incoming gas passing through the tubes. But we do not wish to be limited to these types of converters or to any type, because any type of converter satisfying the conditions required by our process can be employed.

It is evident that by varying the platinum content of the catalytic material and by varying the proportions of the converter, as for instance, the diameter, length and number of tubes, any conditions resulting from varying strengths of gas can be met satisfactorily.

It is also evident that with a predetermined catalytic material and a given design of converter to meet average conditions, by the flexibility of the control of the temperatures of the gases, which we have in our process, any strength of burner gas can be satisfactorily treated without the use of heat from any external source, a result hitherto not obtainable.

The absorption of sulphuric anhydride in strong sulphuric acid is well known both in the practice of the art and in literature. Heat is generated in this operation and the gases and acid are customarily cooled by well known methods. The absorbers 11 are therefore only contrivances for bringing into contact the sulphuric anhydride and the strong sulphuric acid, the gas and acid cooled after such contact and such an operation continued until the acid has absorbed enough sulphuric anhydride to acquire the desired strength. To start with, the acid in the absorbers may be of a strength of 93% to 96% and by circulation through the apparatus may be brought up to a strength of 104% or more.

As the absorption is never perfect we preferably pass the exit gas from the absorbers through a coke box 15 into which steam or water spray is introduced and the final traces of acid are removed from the exit gas. This apparatus is also well known to the art (see Kessler U. S. Patent 520,994).

From the above it is apparent that we have invented a novel process whereby we control the dryness of the air used to burn the sulphur which enables us to dispense with the elaborate purification apparatus which has been essential heretofore, and then humidify the burner gases to the limited extent required for efficient conversion, and thus attain equally good results. The process also enables us to employ gases having a much higher sulphur dioxide content than it has heretofore been possible to employ, and furthermore by reason of the conservation and utilization of all heat we are enabled to control the entire process without additional heat supply.

While we have described above the particular embodiment of our invention which we consider will give the most advantageous results, it should be understood that we do not intend to limit ourselves to that exact process or to the identical steps described, since obviously many changes may be made therein without departing from the spirit of our invention.

What we claim is:

1. The process of manufacturing sulphuric anhydride or sulphuric acid which consists in burning previously molten brimstone with air sufficiently dried to prevent the formation of objectionable acid mists and fogs in the burner gases and subsequently humidifying the said burner gases to the limited extent required for efficient conversion, substantially as described.

2. The process of manufacturing sulphuric anhydride or sulphuric acid which consists in burning previously molten brimstone with air dried in two stages, the last stage being sufficiently dried to prevent the formation of objectionable acid mists and fogs in the burner gases and subsequently humidifying them to the predetermined extent required to produce the moisture content necessary to effect efficient conversion, substantially as described.

3. The process of manufacturing sulphuric anhydride or sulphuric acid which consists in burning previously molten brimstone with air dried in two stages, the last stage being sufficiently dried to prevent the formation of objectionable acid mists and fogs in the burner gases and subsequently humidifying them to the predetermined extent required to produce the moisture content necessary to effect efficient conversion, at least a part of said humidification being accomplished by adding air as dried in the first of the aforesaid stages, substantially as described.

4. The process of manufacturing sulphuric anhydride or sulphuric acid which consists in burning previously molten brimstone with air dried in two stages, the last stage being sufficiently dried to prevent the formation of objectionable acid mists and fogs in the burner gases and subsequently humidifying them to the predetermined extent required to produce the moisture content necessary to effect efficient conversion, said humidification being accomplished by adding air as dried in the first of the aforesaid stages, substantially as described.

5. The process of manufacturing sulphuric anhydride and sulphuric acid which consists in burning previously molten sulphur with air sufficiently dried to prevent the formation of objectionable acid mists and fogs in the burner gases, subsequently humidifying them to the limited extent required for efficient conversion and subjecting them to mechanical purification only and then converting said gases into sulphuric anhydride or sulphuric acid, substantially as described.

6. The process of manufacturing sulphuric anhydride or sulphuric acid which consists in producing burner gases ranging in strength of sulphur dioxide from 3% to 11% by burning previously molten brimstone with air sufficiently dried to prevent the formation of objectionable acid mists or fogs in said burner gases, subsequently humidifying them to the limited extent required for efficient conversion, and subjecting them to mechanical purification only, and then converting said gases into sulphuric anhydride or sulphuric acid, substantially as described.

7. The process of manufacturing sulphuric anhydride or sulphuric acid which consists in burning previously molten brimstone with air sufficiently dried to prevent the formation of objectionable acid mists and fogs in the burner gases, subsequently humidifying them to the limited extent required for efficient conversion and subjecting them to mechanical purification only, and then converting said gases into sulphuric anhydride or sulphuric acid, the heat evolved in carrying out the aforesaid steps being employed in the operation and control of said process, substantially as described.

8. The process of manufacturing sulphuric anhydride or sulphuric acid which consists in burning previously molten brimstone with air sufficiently dried to prevent the formation of objectionable acid mists and fogs in the burner gases, subsequently humidifying them to the limited extent required for efficient conversion and subjecting them to mechanical purification only, and then converting said gas into sulphuric anhydride or sulphuric acid, the heat evolved in carrying out the aforesaid steps being the only heat employed in the operation and control of said process, substantially as described.

MARCH F. CHASE.
FREDERIC E. PIERCE.